United States Patent
Barenyi et al.

[15] 3,663,034
[45] May 16, 1972

[54] SAFETY FRAME STRUCTURE FOR MOTOR VEHICLES, ESPECIALLY PASSENGER MOTOR VEHICLES

[72] Inventors: Bela Barenyi, Maichingen; Bruno Sacco, Sindelfingen; Hermann Renner, Boblingen, all of Germany

[73] Assignee: Daimler-Benz Aktiengesellschaft, Stuttgart-Unterturkheim, Germany

[22] Filed: Oct. 1, 1969

[21] Appl. No.: 862,892

[30] Foreign Application Priority Data

Oct. 3, 1968    Germany......................P 18 00 779.9

[52] U.S. Cl..............................................280/106, 293/64
[51] Int. Cl........................................................B62d 21/00
[58] Field of Search........................280/106; 293/63, 64, 68

[56] References Cited

UNITED STATES PATENTS

| | | | |
|---|---|---|---|
| 1,419,318 | 6/1922 | Singer | 293/64 |
| 1,520,951 | 12/1924 | Igo | 293/64 |
| 1,640,145 | 8/1927 | Donegan | 293/64 |
| 1,710,809 | 4/1929 | Broadwell | 293/68 X |
| 3,130,998 | 4/1964 | Anderson | 293/64 |
| 2,111,563 | 3/1938 | Kliesrath | 280/106 |
| 2,088,453 | 7/1937 | Werdehoff | 280/106 |

*Primary Examiner*—Philip Goodman
*Attorney*—Craig, Antonelli and Hill

[57] ABSTRACT

A safety frame structure for motor vehicles in which the outer ends of the longitudinal lateral bearers which extend from a rather form-rigid center section of the vehicle containing the passenger space to corresponding vehicle ends, are constructed as preferably closed loop-shaped parts.

17 Claims, 6 Drawing Figures

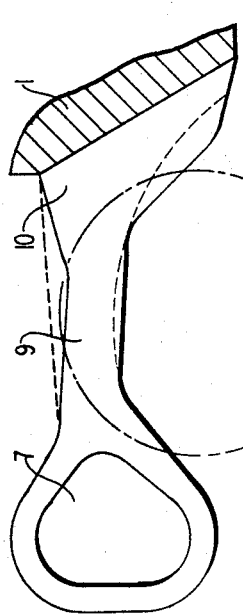
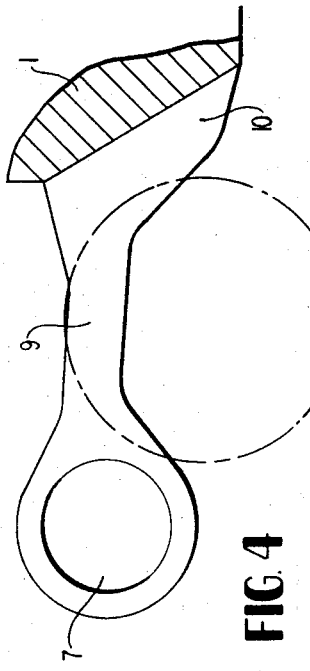
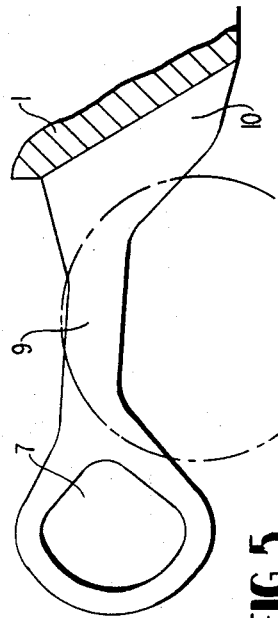
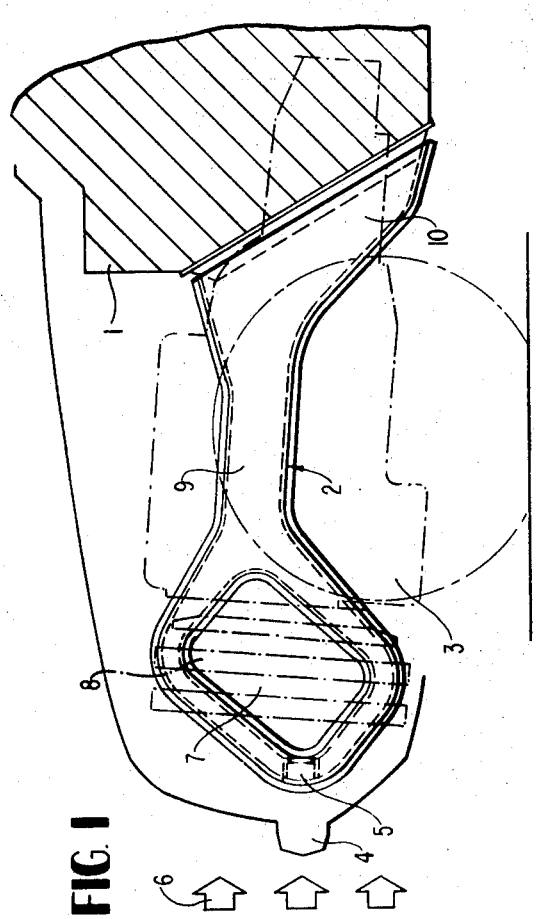
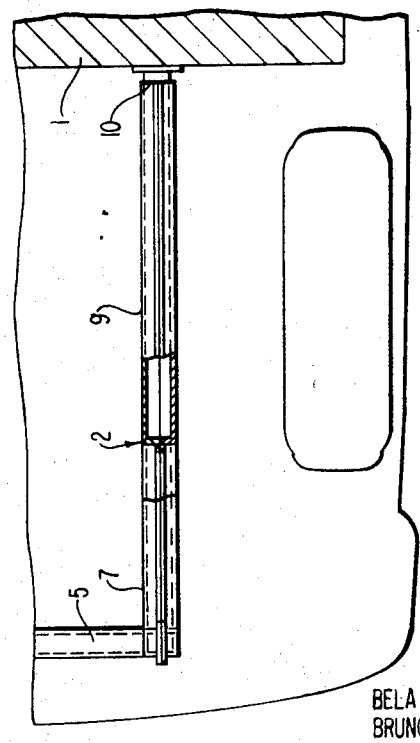

SAFETY FRAME STRUCTURE FOR MOTOR VEHICLES, ESPECIALLY PASSENGER MOTOR VEHICLES

The present invention relates to a safety frame structure for motor vehicles, especially for passenger motor vehicles, whose frame and body are so dimensioned and constructed that their rigidity is largest within the area of the vehicle passenger space and decreases continuously or step-wise toward the ends.

The known construction of a motor vehicle of this type (German Pat. No. 854,157) has proved itself in practice and contributed much to the increase of the internal safety in motor vehicles. The advantageous effect rests on the fact that the vehicle passengers are safely accommodated in the vehicle passenger space constructed as form-rigid as possible whereas the kinetic energy present during an accident is to be reduced by the deformation work of the parts of the frame structure adjoining the vehicle passenger space. The vehicles constructed according to this principle, however, are still capable of further improvement insofar as up to now one has not succeeded in controlling the deformations occurring during an accident and in limiting the same to the extent necessary for the dissipation of the existing kinetic energy. In a majority of the cases, already very strong deformations occur at present during relatively minor collisions which necessitate considerable repair costs for the repair of the vehicle.

The present invention is based on the task to avoid these disadvantages and to create a safety frame structure of the aforementioned type in which the deformation is controllable and adapted to be limited to a predetermined area. The present invention essentially consists in that the outer ends of the longitudinal lateral bearers or the like adjoining the vehicle passenger space of the front and/or rear section are constructed as preferably closed loops. The significant deformation will, in case of an accident, take place at the relatively deformation-soft loops whereby the magnitude of the energy adapted to be dissipated thereby is adapted to be readily influenced by the form and dimensions of the loop structures.

In a structurally advantageous manner, the loops of the longitudinal lateral bearers extend approximately from the bumper up to approximately the front or rear wheels, respectively. It is achieved thereby that the portion of the vehicle disposed between the wheel axles is not adversely affected thereby in case of a minor accident.

It is particularly advantageous if the part of the lateral, longitudinal bearers adjoining the loops is constructed somewhat more form-rigid and the part adjoining the first-mentioned part and serving for the securing at the vehicle passenger space is constructed still more form-rigid. This measure, adapted to be carried out by simple structural means, limits the deformation still more strongly to the area of the loops. Advantageously, the lateral, longitudinal bearers or the like may be secured at the vehicle passenger space by readily detachable threaded connections. Additionally, it may be appropriate if the securing of the longitudinal, lateral bearers at the vehicle passenger space takes place by way of detachable or separable connections, for example, welded connections. It thereby becomes noticeable particularly advantageously that the lateral, longitudinal bearers are secured with their most form-rigid part at the vehicle passenger space, also constructed form-rigid, so that the connecting places do not deform and can be readily detached for purposes of a repair.

Accordingly, it is an object of the present invention to provide a safety frame structure for vehicles which avoids by simple means the aforementioned shortcomings and drawbacks encountered in the prior art.

Another object of the present invention resides in a safety frame structure for passenger motor vehicles which effectively controls the deformations occurring during an accident and limits the same to the extent necessary for the dissipation of the given kinetic energy.

A further object of the present invention resides in a frame structure for the end parts of motor vehicles, especially passenger motor vehicles which leave substantially unaffected the parts of the vehicle disposed between the safety frame structure in case of minor accidents.

These and further objects, features and advantages of the present invention will become more obvious from the following description when taken in connection with the accompanying drawing which shows, for purposes of illustration only, several embodiments in accordance with the present invention, and wherein:

FIG. 1 is a schematic side elevational view of an end part of a motor vehicle constructed in accordance with the present invention;

FIG. 2 is a partial plan view on one-half of the end section according to FIG. 1, the other half being of symmetrical construction; and FIGS. 3 to 5 are schematic side elevational views of three different embodiments of lateral longitudinal bearer structures in accordance with the present invention;

Figure 6:
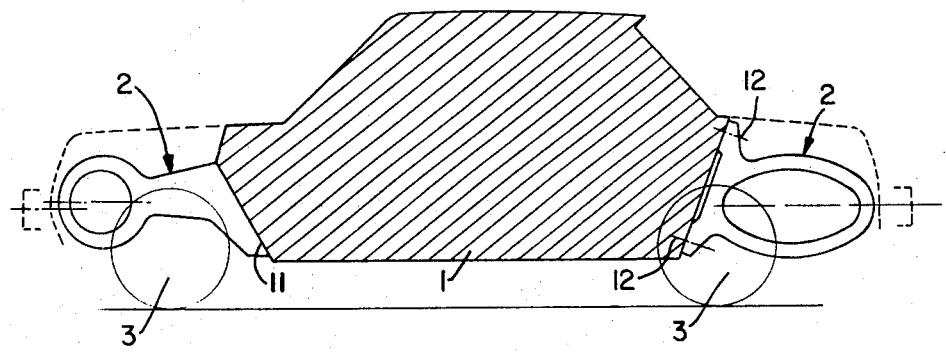
FIG. 6 is a schematic side elevational view of a complete automobile utilizing the construction of the present invention.

Referring now to the drawing wherein like reference numerals are used throughout the various views to designate like parts, and more particularly to FIGS. 1, 2 and 6, reference numeral 1 designates the vehicle passenger space which is constructed very form-rigid. Lateral longitudinal bearer structures or the like generally designated by reference numeral 2 are secured on each side of the vehicle at the vehicle passenger space 1, indicated only schematically. The two longitudinal lateral bearers 2 are interconnected at the forward end thereof, which is arranged approximately within the area of the bumper 4, by a cross bearer 5. In order to obtain a controllable deformation in case of an impact of the vehicle against an obstacle in the direction of arrow 6, the forward ends of the longitudinal bearers 2 are constructed as closed loops 7. These loops 7 which in the illustrated embodiment of FIG. 1 have an approximately rectangular configuration, are relatively deformation-soft and are able to reduce in case of an accident, the existing kinetic energies by deformation work. The inside dimensions of the loops may be so constructed that they can accommodate auxiliary aggregates or units of the driving engine. In the illustrated embodiment, for example, the radiator 8 of the passenger motor vehicle is arranged in the area of these loops 7.

The longitudinal lateral bearer structures 2, constructed, as can be seen from FIG. 2, from two sheet metal halves as hollow bearers, possess three steps of rigidity or steps of yieldingness progressively increasing from in front toward the rear whereby above the area of the wheel axles a somewhat more form-rigid part 9 adjoins the loop 7 which then passes over into a part 10 constructed very form-rigid that serves for the securing of the longitudinal lateral bearers 2 at the vehicle passenger space 1.

The securing of the hollow lateral bearers 2 at the vehicle passenger space 1 can take place by way of welded places 11 adapted to be disconnected or by threaded connections 12 of conventional construction. Since the deformation is limited essentially only to the loops 7, after a deformation, the longitudinal bearers 2 can be readily interchanged because the securing places at the vehicle passenger space 1 have not been deformed.

As shown in the embodiment according to FIG. 3, the loops 7 may have an approximately triangularly shaped configuration. Additionally, the parts 9 and 10 adjoining the loops 7 may be constructed corresponding to the dash lines whereby the form-rigidity thereof can be still further influenced. In the embodiment according to FIG. 4, the loop 7 has a circularly shaped configuration whereas the loop 7 of the embodiment according to FIG. 5 is constructed as a circular segment.

The term "frame structure" has been used in the specification and in the claims to describe any frame structure as known in the art, i.e., either separate frame structures or such equivalent frame structures as are normally found in vehicles with self-supporting type body constructions. Thus, the lateral bearer structures may be separate frame members or may be constructed from suitably assembled sheet-metal stamping or the like, forming part, for example, of a self-supporting-type body construction.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are within the scope of those skilled in the art.

We claim:

1. A safety frame structure for motor vehicles, especially passenger motor vehicles whose frame and body means are so dimensioned and constructed that the rigidity thereof is largest within the area of the vehicle passenger space and decreases toward the end, comprising at least one longitudinal bearer means on each side of the vehicle, said bearer means being disposed in at least one end section of the vehicle to extend from the vehicle passenger space section to a position adjacent an end portion of the vehicle, fastener means for fastening said bearer means to the vehicle passenger space section, each of said bearer means having loop means with a closed loop structure adjacent the end closest to the end portion of the vehicle, the loop means of one bearer means being spaced in the transverse direction from the loop means of another bearer means on the other side of the vehicle, said loop means being plastically deformable for dissipating kinetic energy resulting from collision forces on the end of the at least one end section of the vehicle, characterized in that said at least one end section includes the rear end of the vehicle.

2. A safety frame structure according to claim 1, characterized in that both the front and rear ends of the vehicle are provided with such longitudinal bearer means.

3. A safety frame structure for motor vehicles, especially passenger motor vehicles whose frame means and body means are so dimensioned and constructed that the rigidity thereof is largest within the area of the vehicle passenger space and decreases toward the end, comprising at least one longitudinal bearer means disposed in at least one end section of the vehicle to extend from the vehicle passenger space section to a position adjacent an end portion of the vehicle, fastener means for fastening said bearer means to the vehicle passenger space section, each of said bearer means having loop means adjacent the end closest to the end portion of the vehicle, said loop means being plastically deformable for dissipating kinetic energy resulting from collision forces on the end of the at least one end section of the vehicle, characterized in that the fastener means comprise readily detachable threaded connecting means.

4. A safety frame structure for motor vehicles, especially passenger motor vehicles whose frame means and body means are so dimensioned and constructed that the rigidity thereof is largest within the area of the vehicle passenger space and decreases toward the end, comprising at least one longitudinal bearer means for each side of the vehicle, each of said bearer means being disposed in an end section of the vehicle to extend from the vehicle passenger space section to a position adjacent an end portion of the vehicle, fastener means for fastening said bearer means to the vehicle passenger space section, each of said bearer means having loop means with a closed loop polygon shaped structure adjacent the end closest to the end portion of the vehicle, the loop means of one bearer means being spaced with respect to the loop means of other bearer means, and wherein said loop means are plastically deformable for dissipating kinetic energy resulting from collision forces on the end of the vehicle end section.

5. A safety frame structure according to claim 4, characterized in that said end section is the front end of the vehicle.

6. A safety frame structure according to claim 4, characterized in that said vehicle includes bumper means at the extreme end of the respective end section and wheel means inwardly of said extreme end and in that the loop means of the longitudinal bearer means extend approximately from a respective bumper up to the corresponding wheels of the respective vehicle end.

7. A safety frame structure according to claim 6, characterized in that the part of the longitudinal bearer means adjoining the loop means is constructed somewhat more form rigid than the loop means and the part adjoining said last-mentioned part and serving for the securing of the longitudinal bearer means at the vehicle passenger space is constructed still more form-rigid.

8. A safety frame structure according to claim 7, characterized in that the fastener means comprise readily detachable threaded connecting means.

9. A safety frame structure according to claim 4, characterized in that the fastener means comprise detachable connecting means.

10. A safety frame structure according to claim 9, characterized in that said connecting means are formed by welded connections.

11. A safety frame structure according to claim 1, characterized in that said vehicle includes bumper means at the extreme end of the respective at least one end section and wheel means inwardly of said extreme end and in that the loop means of the longitudinal bearer means extend approximately from a respective bumper up to the corresponding wheels of the respective vehicle end.

12. A safety frame structure according to claim 4, characterized in that the part of the longitudinal bearer means adjoining the loop means is constructed somewhat more form rigid than the loop means and the part adjoining said last-mentioned part and serving for the securing of the longitudinal bearer means at the vehicle passenger space is constructed still more form-rigid.

13. A safety frame structure according to claim 4, characterized in that the fastener means comprise detachable connecting means.

14. A safety frame structure according to claim 13, characterized in that said connecting means are formed by welded connections.

15. A safety frame structure according to claim 11, characterized in that the part of the longitudinal bearer means adjoining the loop means is constructed somewhat more form rigid than the loop means and the part adjoining said last-mentioned part and serving for the securing of the longitudinal bearer means at the vehicle passenger space is constructed still more form-rigid.

16. A safety frame structure according to claim 4, characterized in that said loop structure is in the shape of a quadrangle.

17. A safety frame structure according to claim 4, characterized in that said loop structure is in the approximate shape of a triangle.

* * * * *